(12) United States Patent
Eriksson

(10) Patent No.: US 11,139,773 B2
(45) Date of Patent: Oct. 5, 2021

(54) METAL BUILDING ROOF MOUNT FOR SOLAR ARRAY

(71) Applicant: Aaron Eriksson, Escondido, CA (US)

(72) Inventor: Aaron Eriksson, Escondido, CA (US)

(*) Notice: Subject to any disclaimer, the term of this patent is extended or adjusted under 35 U.S.C. 154(b) by 0 days.

(21) Appl. No.: 16/331,124

(22) PCT Filed: Jan. 22, 2019

(86) PCT No.: PCT/US2019/014628
§ 371 (c)(1),
(2) Date: Mar. 6, 2019

(87) PCT Pub. No.: WO2019/144154
PCT Pub. Date: Jul. 25, 2019

(65) Prior Publication Data
US 2021/0075363 A1    Mar. 11, 2021

Related U.S. Application Data

(60) Provisional application No. 62/619,273, filed on Jan. 19, 2018.

(51) Int. Cl.
*H02S 20/23*    (2014.01)
*H02S 30/10*    (2014.01)

(52) U.S. Cl.
CPC .............. *H02S 20/23* (2014.12); *H02S 30/10* (2014.12)

(58) Field of Classification Search
CPC ................................. H02S 20/23; H02S 30/10
See application file for complete search history.

(56) References Cited

U.S. PATENT DOCUMENTS

| 6,065,256 A * | 5/2000 | Joko ............... E04D 3/3608 52/173.3 |
| 6,182,403 B1 | 2/2001 | Mimura |
| 2011/0138710 A1 | 6/2011 | Reisdorf |
| 2017/0033730 A1 | 2/2017 | Almy |
| 2020/0389121 A1 | 12/2020 | Stephan |

FOREIGN PATENT DOCUMENTS

| EP | 2725309 | 4/2014 |
| WO | 2019144154 | 7/2019 |

OTHER PUBLICATIONS

Erikkson; U.S. Appl. No. 17/077,786 filed Oct. 22, 2020.
PCT; International Search Report for PCT/US2019/014628 dated Apr. 25, 2019.

\* cited by examiner

*Primary Examiner* — Matthew T Martin
(74) *Attorney, Agent, or Firm* — Fitch, Even, Tabin & Flannery LLP

(57) ABSTRACT

A solar panel mounting system forming an opening for holding solar panels therein for easy installation and removal and replacement. The system includes a plurality of support members adapted for positioning on a support surface. A roof panel is positioned on a top surface of adjacent support members and compressibly held in place by an astragal which is fastened to the support member sandwiching the roof panel between the astragal and the support member. A solar panel opening is formed between projecting portions on opposing sides of the roof panel which extend at an angle substantially perpendicular to a top surface of the support member.

11 Claims, 7 Drawing Sheets

METAL BUILDING ROOF MOUNT FOR SOLAR ARRAY

This application claims priority to U.S. Provisional Patent Application Ser. No. 62/619,273, filed on Jan. 19, 2018, which is incorporated herein in its entirety by this reference thereto.

BACKGROUND OF THE INVENTION

1. Field of the Invention

The present invention relates generally to solar panels, solar heating, and other solar based systems for rooftop positioning on buildings. More particularly, it relates to a system for mounting solar panel arrays of photovoltaic or heating in solar heating arrays or the like on building rooftops which have a roof formed of engaged metal rooftop panels or homes having a wood roof or similar planar rooftop installations. The system provides cooperatively engageable metal roof panels for forming a rack system with a sealed roof of the building, which so engaged, concurrently provides a plurality of vertically projecting sections of adjacent panels. These projecting sections formed as part of each adjacent roof panel form above support members for supporting a solar panel for photovoltaic or water heating or another frame-engaged array, elevated above the formed roof and form a passage therebetween. An engageable astragal is positionable to secure the solar panels and seal the passage between projecting sections of adjacent roof panels.

2. Prior Art

In recent years, it has become more popular in the United States and many foreign countries for building owners to install solar panels and solar heating and other solar-based devices on the rooftops of such building. Such installations of solar panel arrays generate electricity which can power the building itself or be communicated to the local grid. Many state and national governments offer tax incentives to building owners who make the financial commitment to install solar panels on such buildings.

Conventional metal roof systems, however, perform acceptable weatherproofing functions but such metal roof panels are currently configured for engagement to each other and underlaying support surfaces. However, they are not configured to incorporate solar panel attachment as part of the formed roof panels and roof structure.

Solar panel and solar heating attachment to roofs, via conventional racking, is not a designed or intended use of any other roofing system. While racked solar panel engagement to roofs is allowable, the piercing of the metal roof panels to mount the various components for holding solar panels in an array on the metal rooftop, is not desirable because the more screws and fasteners which pierce the seal of a roof panel, the more likely it is to leak over time. Further, solar system engagement mounting components and fasteners and the like are designed and sold separately from the roof panels, and the panels themselves have no structural accommodation to hold the solar panels or their mounting system.

As a consequence, solar racking systems continue to employ a conventional rail mounting system for the solar panel array, in both tilt leg and flush mount configurations. They do not, however, integrate the solar panels with the metal roof system itself and, thus, do not provide both roofing panels adapted for engagement to each other which also configure on the roof for a seamless engagement with the solar panel array.

Such a lack of integration between metal roofing panels and the solar array engaged with them has caused conventional solar panels to be mounted a distance above the underlying metal roof panels. Such causes problems such as an uplifting force from wind communicating between the solar panels and the metal roof panels which can cause significant damage. Further, conventional systems having a gap up to five inches or more between the solar panels, and roof panels allow birds and small animals to climb into the gap where they nest. This animal occupancy can wreak havoc with the mechanics of tilting solar panels along with leaves and debris which can enter the gap.

The forgoing examples of related art as to solar panel and solar heating systems and their engagement to metal rooftops, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art with regard to engaging solar panels, solar heating components, and other solar arrays to the rooftops of buildings having metal roofs. While, for convenience, the language herein is directed primarily to photovoltaic solar panels, the mounting system herein is also configurable to hold solar heating panels, and other solar-energized components on a rooftop of a metal building. As such, when the term solar panel is employed herein, any boxed or paneled component which is rooftop-mounted on a metal building is to be considered included.

The integrated metal roof and solar mounting system herein, is configured to allow conventional solar photovoltaic arrays to be installed with a metal roofing system using the same construction means and methods that are conventionally already widely used in the roofing industry. Thus, no exceptional training or tools are required for the installation of the metal roof panels herein, to the underlying structure.

One core element to the system herein is the provision of metal roofing sections, which are adapted for attachment to the underlying support surface for the roof in a conventional screw type engagement. However, rather than conventional planar opposing side edges for each metal roof panel, the opposing side edges of the metal roof panels of the system herein include the addition of vertically projecting portions running along opposing side edges. Each such metal roof panel is a unitary planar structure which on opposing sides has a bend which forms projecting side portions. One side portion extends substantially normal to the planar portion in between. The opposing side portion is adapted to slidably engage with that of an adjacent metal roof panel to allow for adjustment. By planar is meant substantially flat, although, corrugations or channels are formed in a conventional fashion which run parallel to the opposing sides of the metal roof panel and, thus, substantially parallel to the projecting portions on both sides.

Also provided is an astragal which is employable to compress and secure a solar panel to the roof formed by the metal panels. This astragal additionally forms a seal over adjacent roof panels in another particularly preferred component of the device and method herein. The formation of the metal roof panels with opposing projecting and slidably engaged side edges, and the inclusion of the astragal herein which is configured to hold the solar panels and concurrently seal the two adjacent roof panels and their respective projecting edges, effectively merges two historically different scopes of work into one, and roofing and solar panels become a solar roof system.

The roofing system herein increases the performance of the solar collection of the array, and with the system herein, the solar materials provide additional insulation factors that improve the heat loss/gain profile of the roof. This is accomplished with the system herein by its configuration which traps a layer of air between the solar panels and metal roof panels which also provide shade to the roof surface formed of the engaged metal panels herein.

Still further the system herein provides channels and gaps which protect the electrical conductors of the solar panels in the formed array. Additionally, for aesthetic reasons the system herein allows for insulation blanks to be positioned where needed to improve the seamless aesthetic of the installation of the solar array of panels along valleys and gables. Still further, by combining the solar panels and roof and underlying structure into a single function, the value of the tax credit to the building owner can increase substantially.

With respect to the above description, before explaining at least one preferred embodiment of the herein disclosed metal roofing system with integrated solar panel engagement and the method therefor, it is to be understood that the disclosed system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other roof and solar panel structures, methods and systems for carrying out the several purposes of the present invention. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the invention. It is intended that the embodiments and figures disclosed herein are to be considered illustrative rather than limiting. In the drawings.

Figure 1:
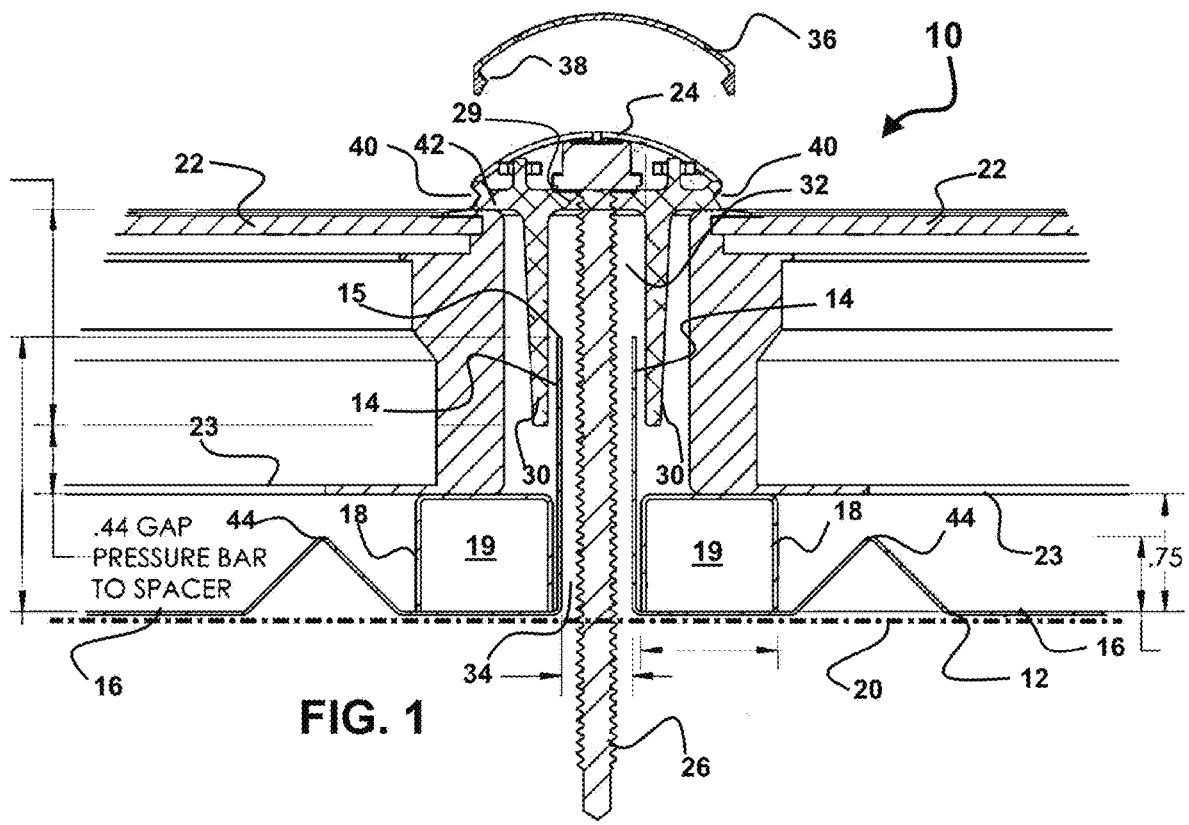
FIG. 1 shows a sectional view of the system herein showing the metal roof panels formed with side edges which project substantially normal to the metal panel therebetween, and showing the astragal and engageable cap which hold the solar panels and form a seal between adjacent metal roof panels.

Other aspects of the present invention will be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the nose engagement device as it is oriented and appears in the drawings and are used for convenience only; they are not intended to be limiting or to imply that the device has to be used or positioned in any particular orientation.

Now referring to drawings in FIGS. 1-11, wherein similar components are identified with like numerals, FIG. 1 shows a depiction of a sectional view of the engaged components of the device 10 herein, enabling the method herein of FIGS. 7-11 where a rack system is formed for positioning of solar panels thereon above a metal or wood or other roof structure.

Figure 9:
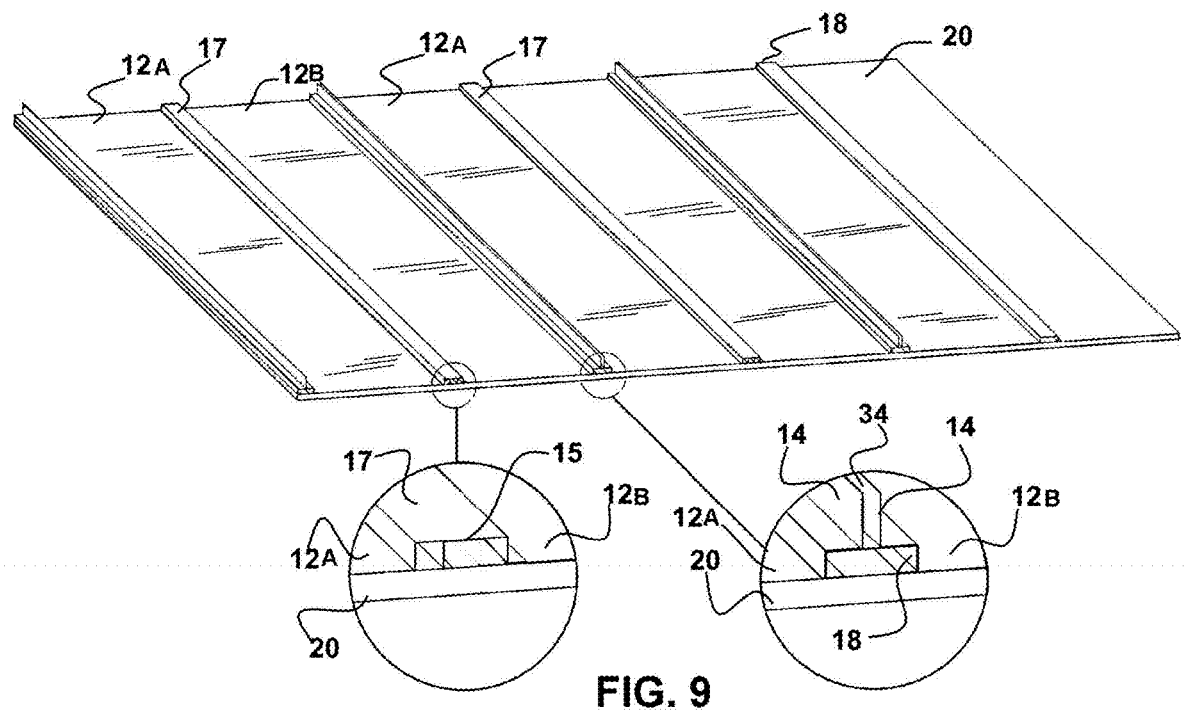

In FIG. 1 is shown the novel metal roof panels 12 each of which is formed with side edges having formed projecting portions 14. In some cases there may be only one projecting portion 14 along one edge of a roof portion of the roof panel 12, such as shown in FIG. 9 in the enlarged sections. In this mode, a first roof portion 12A engages a second roof portion 12B along a folded edge 15 located on the opposite side of each from the projecting portion 14 thereof. Thus, the roof panel 12 is formed by the first roof portion 12A engaged to the second roof portion 12B along the folded edge 15 of each to form the full roof panel 12.

In some installations the roof panels will be formed in a unitary structure with projecting portions 14 running along both side edges. In other roof panels 12 where more adjustment for positioning is desired, the folded edges 15 on the opposite sides of roof portions 12A and 12B from the projecting portion 14, allow for a sliding engagement to adjacent roof portions to form the roof panels 12 and to adjust the roof panels 12 slightly side to side during installation. This allows for a slight adjustment of the size of the formed openings 41 for the solar panels 22 between the projecting portions 14 on opposite sides of the formed roof panel 12. This sliding engagement of folded edges 15 of two roof portions 12A and 12B (FIG. 9) also forms a secondary supporting member 17 (FIGS. 9-11) for holding center portions of the solar panels 22 elevated which is particularly preferred.

The projecting portions 14, along one side edge of the roof panels 12, are formed by a bend in the metal material along the side edge. Each projecting portion 14 extends from the side edge on which it is positioned, at an angle substantially normal to the planar mid-section 16 of the metal roof panels 12. By substantially normal is meant plus or minus 10 degrees from perpendicular.

As shown in FIG. 1, each roof panel 12, whether formed of two engaged roof portions or a roof panel 12 in one section, sits atop an underlying support structure 20 shown in dotted line.

Screws 26 engaged to the underlying support structure impart force against the support members 18 to hold them and to hold the metal roof panels 12 sandwiched under them, in position. Such underlying support structures for example include a metal roof of an existing building or a wood or shingled roof. Also shown are the support members 18, which abut and overlay the projecting portions 14 of the adjacent roof panels 12, which are positioned thereon and can support the solar panel 22, thereon. The support members 18 may be formed in two sections as in FIG. 1, or in a single section shown in FIG. 1A or 1B which is preferred, since it positions a seal formed by the bent portions of the roof panel 12 over the top of the support member 18 leading to the projecting portion 14. This positions the roof panel 12 in the mode of FIGS. 1A and 1B, above any communication of the screw 26 through the underlying roof structure.

An astragal 24, shown in FIG. 1, is placed in operative compressive engagement with adjacent solar panels 22 which is particularly preferred in all modes of the system 10 herein. A screw 26 is engaged through a central portion 29 thereof during installation, to hold the astragal 24 to the underlying support surface 20. This screw 26 can be adjusted to impart a measured compression to the astragal 24, which in turn will contact and engage the edges of the solar panels 22 or frames surrounding them in a compressive sealed contact therewith. This compressive engagement will also impart force to the bottom side of the solar panel 22 against the support members 18 and will compressively engage projecting contact points 28 (FIG. 2) on opposing sides of the astragal 24 against the perimeter edge of the solar panel 22 to compressibly engage it and hold it in place.

Depicted in FIG. 1, also, are parallel ribs 30 having a gap 32 therebetween. This gap 32 is aligned with an opening 34 positioned between the two projecting portions 14 which are on one respective side of each of the two roof panels 12. With the screw 26 operatively engaged with the underlying surface 20, and the astragal 24 compressibly engaged against the adjacent solar panels 22, the gap 32 and opening 34 between projecting portions 14, align to provide the path for the screw 26 to be engaged with the underlying support surface 20.

Figure 1A:
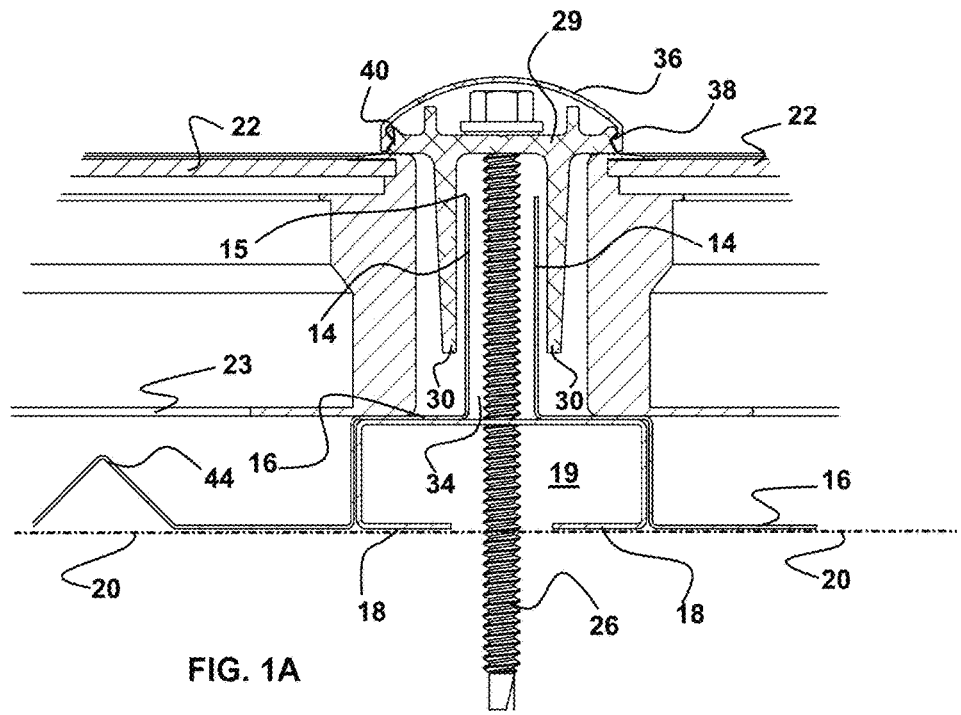
FIG. 1A is a sectional view of another mode of the system herein similar to that of FIG. 1, except that it employs a single support member which is positioned underneath the roofing panels rather than on top as in FIG. 1.

Additionally, the two ribs 30 are formed of a length projecting from the center portion 29, to extend past the distal ends 15 of the projecting portions 14 when the screw 26 is tightened to compress the astragal 24 against the solar panels as in FIGS. 1 and 1A. This forms a moisture seal to prevent fluid which might get past the compressive engagement and seal of the astragal 24 against the adjacent solar panels 22 and prevent such from getting into the opening 34 between adjacent roof panels 12.

Figure 1B:
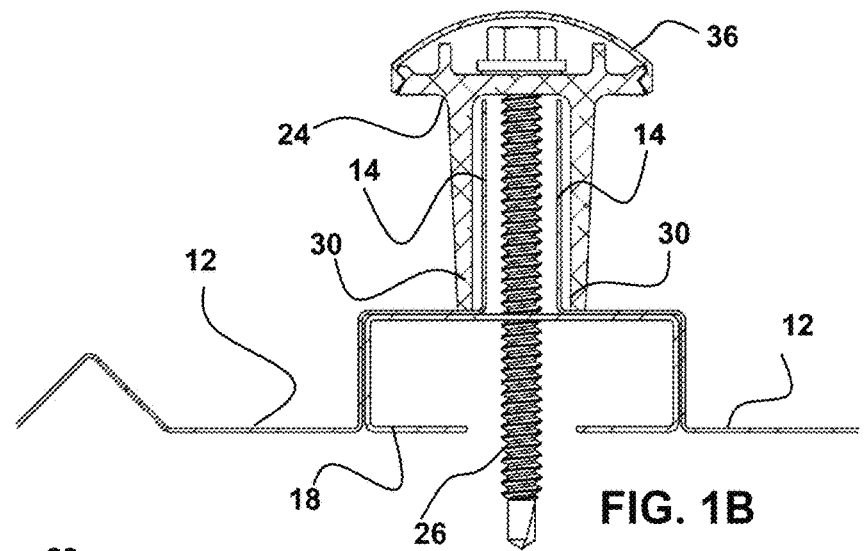
FIG. 1B shows the astragal engaged to an underlying support member and holding adjacent panels in a compressed sandwiched engagement, without a solar panel engaged which can be added at a subsequent time by loosening the screw and inserting solar panels under the opposing edges of the astragal.

Also shown in FIGS. 1, 1A, and 1B, is an engageable cap 36 which has side edges 38 which are configured to engage into recesses 40 in the opposing sides of the astragal 24. The cap 36 is formed of a flexible or elastic material which allows the side edges 38 to temporarily when the cap 36 is pushed against the surfaces of the astragal 24 above the recesses 40 and deflect and then compress into the recesses 40. Once the edges 38 engage into the recesses 40 they form a water tight seal over the top and sides of the astragal 24.

While not shown in detail in FIG. 1, the interior cavities 19 of the support members 18 or more preferable, the area within the opening 34 between the projecting portions 14, both define passages which may be employed for positioning of wiring for both the solar panels 22 and any controllers or the like. The opening 34 works especially well since prior to positioning of the astragal 24 thereover, the wires are easily tucked into the opening 34 and then covered with the astragal 24.

Shown in FIG. 1B, is a unique functional aspect of the system 10 herein, where the solar panels 22 have not yet been installed or have been removed. This is particularly preferred because there are instances where solar panel installation is delayed, or where they must be removed and replaced. Using the system 10 herein, the support members 18 can be installed onto the underlying support structure, and the roof panels 12 can be operatively positioned with the projecting portions 14 extending thereabove. The astragal 24 can then be engaged to form a seal with the ribs 30 contacting the support member 18 by tightening the screw 26. Once the solar panels become available, or are repaired and ready for replacement, the screw 26 may be loosened temporarily, and the solar panels 22 can be installed as in FIG. 1A. The utility provided by the system 10 as shown in FIG. 1A is particularly important because there are times when solar panels are damaged and must be removed and replaced, or when the panels arrive too late for a winter installation. The ability to form the mounting system 10 herein which forms the racks for easy installation, and or removal and reinstallation of subsequently installed solar panels 22 gives the contractor an advantage.

Figure 2:
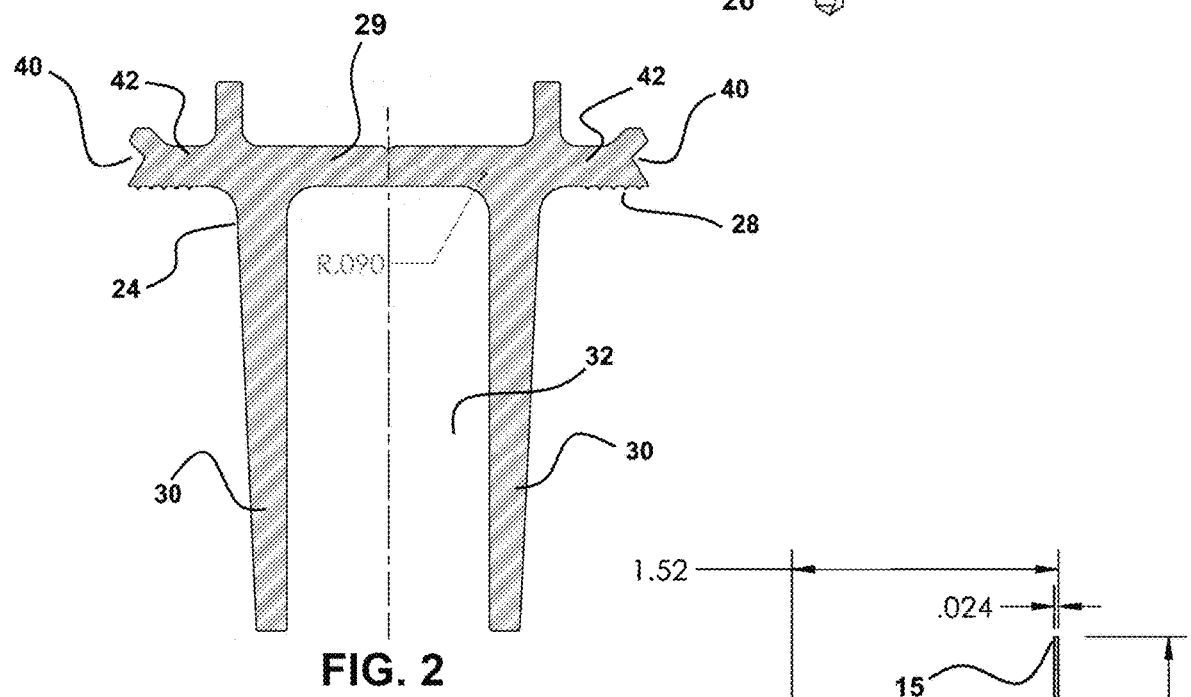
FIG. 2 shows a side view of the astragal herein employed as in FIG. 1.

Shown in FIG. 2 is an end view of the typical astragal 24 herein employed as in FIG. 1. The projecting contact points 28 can be seen on the lower edges of opposing projecting ledges 42 projecting in opposite directions on opposing sides of the body forming the astragal 24. These points 28 have been found to better engage with the surface of the solar panels 22 and form a secure contact and seal therewith. Also shown are the ribs 30 projecting from the center portion 29 a distance for surrounding the opening 34 between the two projecting portions 14. Also depicted are the two recesses 40 formed into the edges of the ledges 42 which engage to the side edges 38 formed on the flexible cap 36.

Figure 3:
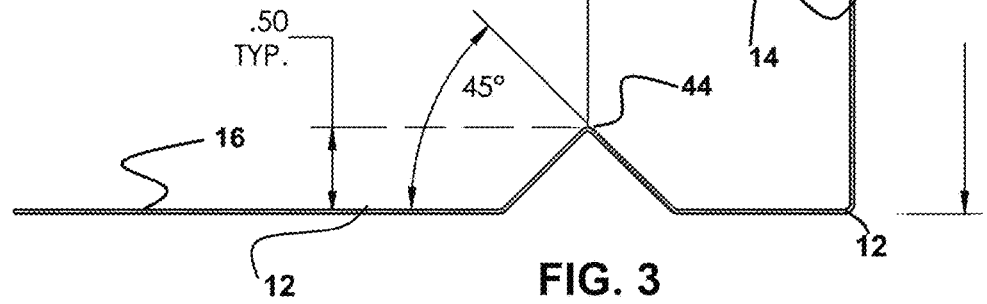
FIG. 3 shows the metal roofing panel herein provided having projecting portions formed along opposing side edges of the metal panel.
Figure 10:
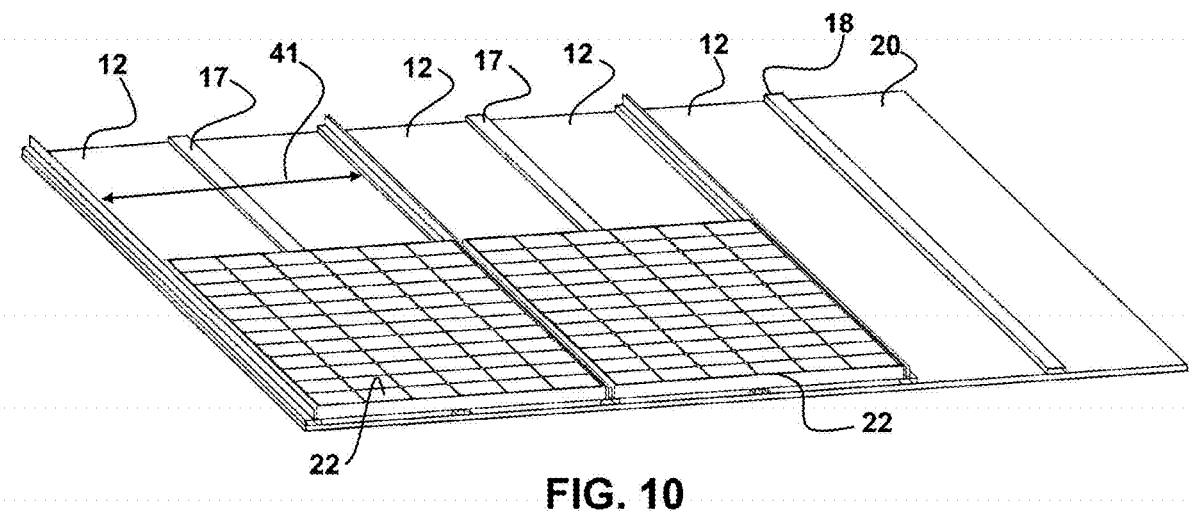
Figure 11:
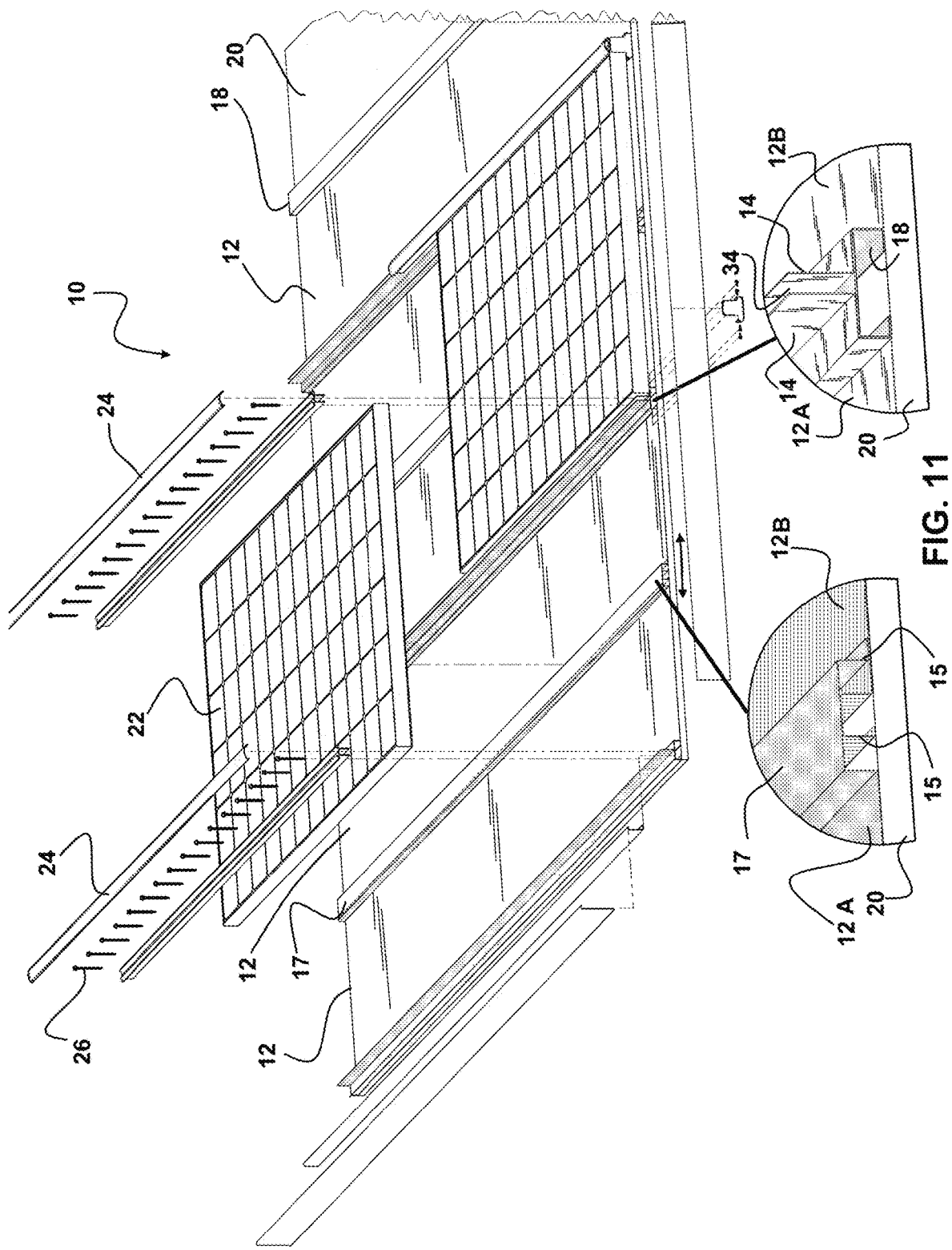

In FIG. 3 is shown one side edge of the metal roofing panel 12 per the device 10 and method herein. As depicted, the projecting portions 14 can extend from one or both side edges of the roof panel 12. As noted, the projecting portions 14 run substantially normal to the planar mid section 16 of the panel 12. As also noted, in a particularly preferred mode of the system 10 which uses two roof portions 12A and 12B (FIG. 9) engaged at folded edges 15 which forms the secondary support members 17, the opposite side edges of the formed roof panels 12 from the projecting portion 14 of each, can be configured with the folded edge 15 as in FIGS. 9 and 11. When engaged over each other, the folded edges 15 form the secondary support member 17 shown in FIGS. 9-11.

Where both side edges of the roof panels 12 have the projecting portion 14 and the roof panel is formed in a single sheet, support members 18 may be positioned on the underlying structure instead of forming the secondary support members 17. However, by forming the roof panels 12 in a first and second portion 12A and 12B as noted herein, each having folded edges 15 such that they will engaged and form the secondary support members 17, additional support is provided to the solar panels 22. This additional support is provided without the need or expense for extra support members 18 such as shown in FIGS. 9-11. Optionally the folded edges 15 can be formed to slide slightly upon each other, to allow for a side to side adjustment of the first and second portions 12A and 12B of roof panel 12, (FIG. 9) to provide additional function in that the size of the openings 41 (FIG. 10) can be adjusted if needed.

Figure 4:
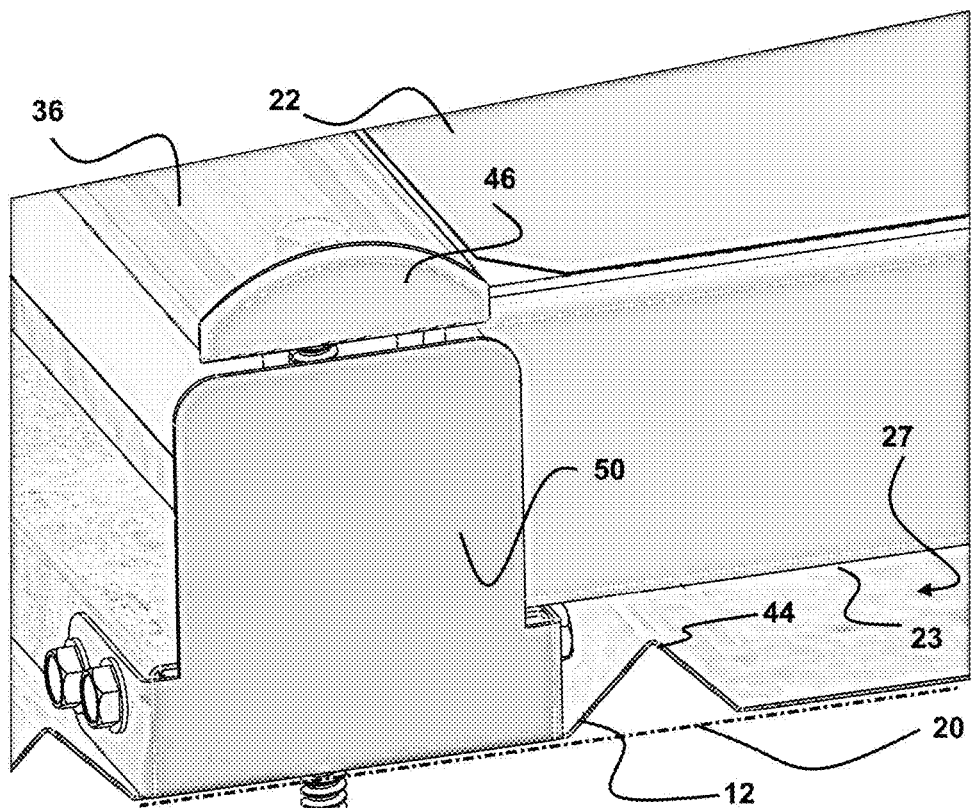
FIG. 4 shows the system herein in a perspective end view showing a cap engaged along the astragal which holds the solar panels atop the underlying support members and showing the very small gap between the back of the solar panel and planar portions of the roof.
Figure 5:
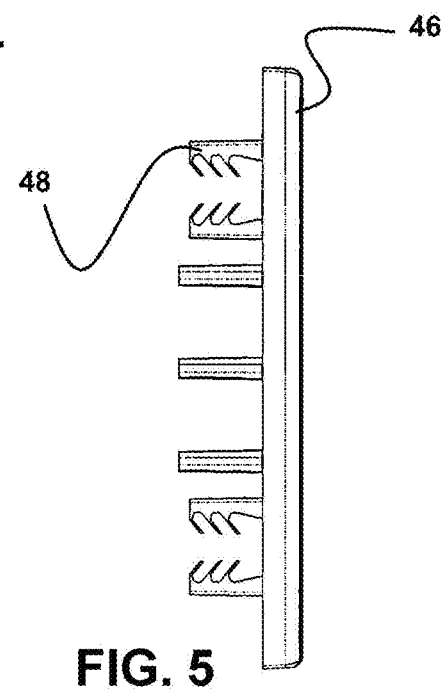
FIG. 5 shows an end view of an end cap engageable with the astragal as in FIG. 4.

FIG. 4 depicts the device herein in a perspective end view of the device 10 in an assembled mode, showing the cap 36 engaged along the astragal 24. The astragal 24 is engaged by the screw 26 to the underlying support structure 20 and compressibly engages the ledges 42 against the solar panel 22 edge. An end cap 46 is shown engaged to the upper side edge of the astragal 24 using projecting prongs 48 (FIG. 5). An end cap 50 is also shown covering the open ends of the support members 18 and the gap 32 and covers the opening 34 shown in FIG. 1.

As can be seen in FIG. 1 and FIG. 4, using the system herein, a very small gap 27 is formed between the rear surface 23 of the solar panel 22 and the upper surface of the roof panel 12. Such is preferably between ½ to ¾ of an inch and can be smaller if the peak of the formed ridges 44 are less than ½ inch above the surface of the mid section 16 of the roof panel 12. Such prevents lift from wind and the intrusion of animals and birds underneath the solar panels 22 and a secondary cover not shown can be provided to cover this gap 27. The gap 27 provides a passage for venting heat from the solar panels 22.

The end cap 46 can be formed to fit inside the cap 36 on top of the solar modules. This requires that the astragal 24 to shortened slightly shorter than the solar modules to provide space for the end cap 46. The end cap 46 in all modes is preferably formed of a compliant material (for example rubber or foam) and it could also serve as an expansion joint between sections of the astragal 24 to prevent thermal expansion stresses while concurrently eliminating any gaps.

FIG. 5 shows an end view of the end cap 46 engageable with the top portion of the astragal 24 as in FIG. 4. The prongs 48 are configured to removably engage in recesses 40 formed in the astragal 24 as can be seen in FIG. 1.

Figure 6:
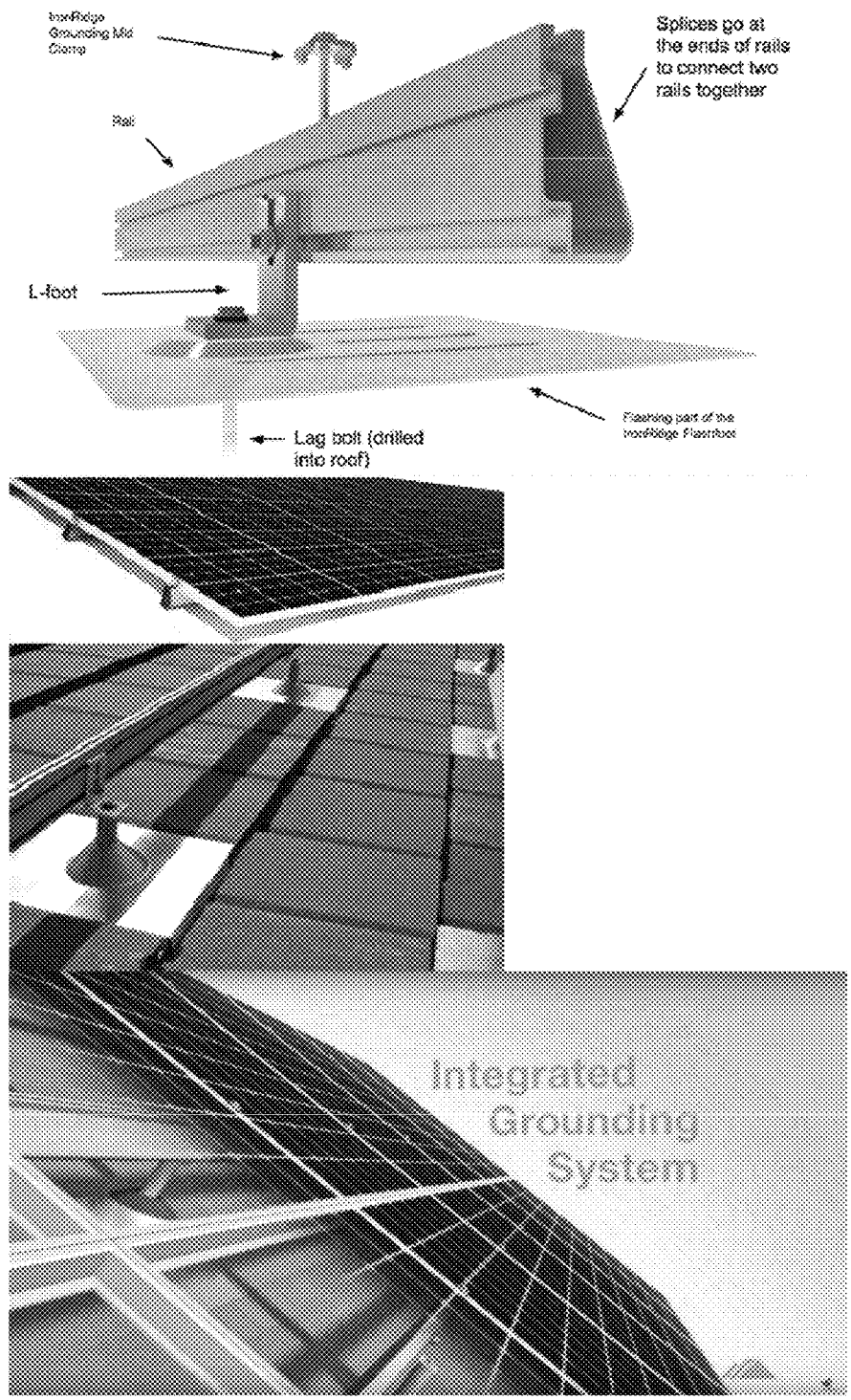
FIG. 6 depicts a conventional solar panel installation wherein the metal roof panels are not integral to the installation and instead the solar panels are supported on a frame supported by posts with a large gap between the frame and roof surface.

FIG. 6 is for reference and depicts a typical prior art view of the mounting of conventional solar panel systems on rooftops, which those skilled in the art will be familiar with. As can be seen, the roof panels conventionally are separate from and form no part of the engagement system, which is mounted on purlins and rafters elevated above the roof. In conventional systems, many more holes are drilled through the support structure such as a roof and they are not covered by any sealing system such as herein.

FIGS. 7-11 show components of the system 10 herein being installed onto an existing roof of a metal or wood roof of a building to form a rack system adapted for the easy and secure positioning of solar panels thereon. As shown in FIGS. 7-11 the roof panels 12 can be formed of a first section 12A and second section 12B, which engage at respective folded edges 15 opposite respective projecting portions 14 thereon.

Figure 7:
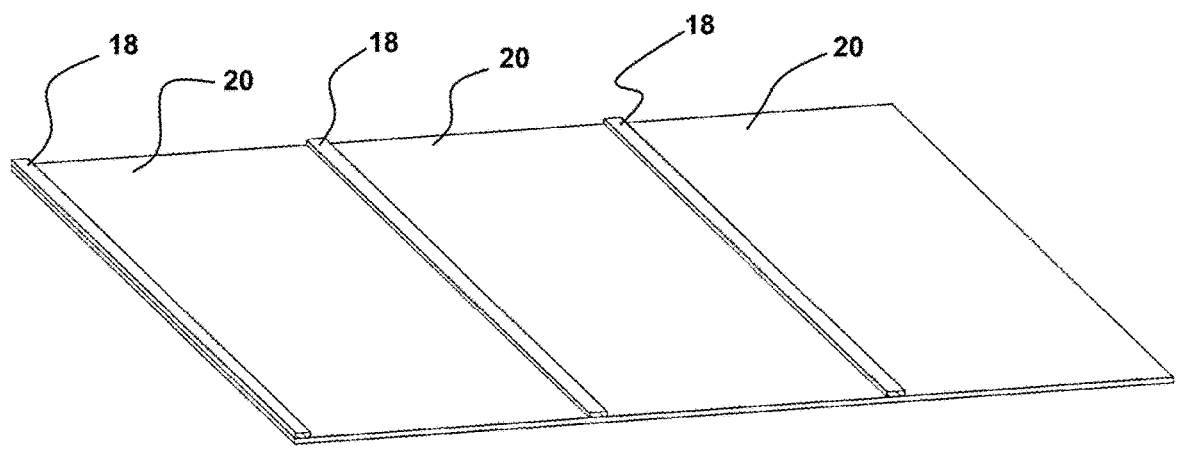
FIGS. 7-11 show components of the system herein being installed onto an existing roof of a metal or wood roof of a building to form a rack system adapted for the easy and secure positioning of solar panels thereon.

In the system 10 herein, in a first step, shown in FIG. 7, support members 18 are positioned on the support structure 20 such as an underlying roof surface of a building. Where the roof panels 12 have projecting portions 14 on both opposing side edges, extra support members 18 may be installed to provide center support to overlying solar panels 22 if needed.

Where the roof panels 12 are formed in sections 12A and 12B, with a first side edge having the projecting portion 14 and the opposing second side edge having a folded edge 15 configured to engage over and with a similar folding edge 15 of an adjacent roof panel 12, the engagement forms the secondary support member 17. This secondary support member provides support to the solar panels 22 and maintains the gap 32 between them and the underlying support structure 20.

This mode of the system 10 herein is preferable since it allows for smaller sections 12A and 12B to form the roof panels 12 which are easier to handle in wind and weather. It is additionally preferred since it forms an overlapping seal of the folded edges 15 as well as a strong secondary support member 17 to help support the solar panels 22 better.

Figure 8:
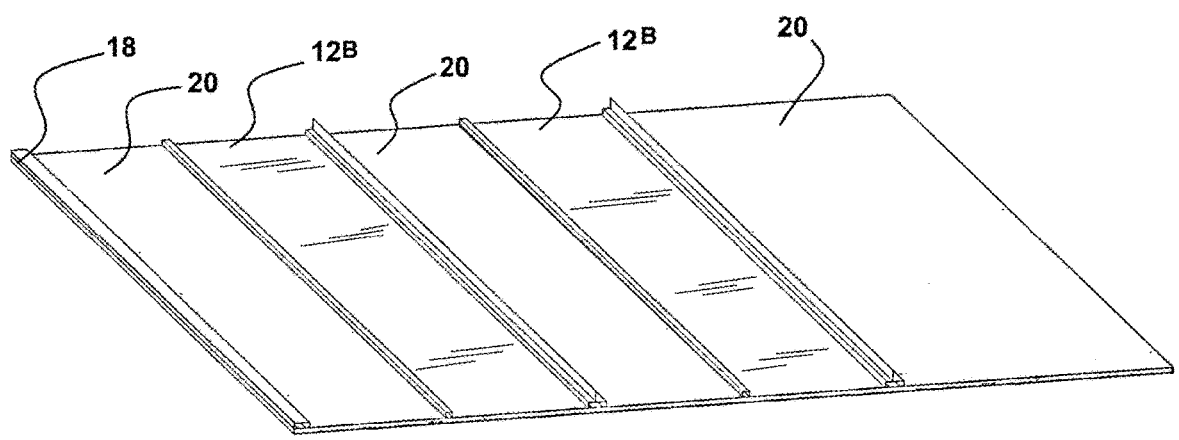

In FIG. 8 is shown the positioning of portions of the roof panels 12 to be formed in the manner shown in FIG. 9, upon the support members 18 shown installed in FIG. 7. Each roof panel portion 12B has a first side edge with the projecting portion 14 and an opposing second side edge with a folded edge 15 such as shown in FIGS. 9 and 11 where the folded edges 15 overlap.

This is followed by the positioning of the rest of the roof panel portions 12A shown in FIG. 9, wherein each of the support members 18 have a pair of parallel projecting portions 14 of adjacent roof panels 12 thereabove, and each of the folded edges 15 on the second side edges of the roof panels 12 are overlapped to form the secondary support members 17.

Thereafter as shown in FIG. 10, the solar panels 22 are placed within openings 41 formed between the support members 18 which have the two projecting portions 14 of roof panels 12 extending thereabove. Central areas of the openings 41 have the formed secondary support members 17 therein to support the underside of the solar panels 22. The width of the formed openings 41 between the projecting portions 14 on opposing sides of each formed roof panel 12 is adapted for positioning the solar panels 22 therein. Whether the roof panels 12 are formed in a single unit with projecting portions 14 on both opposing sides as in FIG. 1, or as two roof panel portions having engaged folded edges 15 as in FIGS. 7-11, the width of the openings 41 is configured to position sides of the solar panels 22 over the support members 18 and adjacent the projecting portions 14 so they are engaged by the contact points 28 of the ledges 42 extending from the center portion 29 of the astragal 24 when the screw 26 is tightened.

Finally, FIG. 11 shows the system 10 herein, formed from the roof panels 12 of FIGS. 7-10 where second sides of the roof panels 12 overlap and form the secondary support members 17. However, if roof panels 12 having projecting portions 14 formed on both opposing side edges are employed, the assembly of the system 10 shown in FIG. 11 is substantially the same but for the positioning of additional support members 18 where the secondary support members 17 are formed by roof panels 12 with the folded edges 15 on second sides.

While all of the fundamental characteristics and features of the combined metal roof panel and solar panel mounting components of the device herein enabling the method herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A solar panel mounting apparatus, comprising:
    a first support member having an upper surface and having a lower surface configured for positioning upon an underlying support surface;
    a second support member having an upper surface and having a lower surface configured for positioning upon said underlying support surface;
    a metal panel having a central area extending between a first side edge and an opposite second side edge;
    said metal panel having said first side edge positioned upon said upper surface of said first support member, and having said second side edge positioned upon said upper surface of said second support member;
    a first projecting portion of said metal panel extending to a distal end from said first side edge, said first projecting portion including a portion extending from the first side edge at an angle substantially normal to said upper surface of said first support member;
    a second projecting portion of said metal panel extending to a distal end from said second side edge, said second projecting portion including a portion extending from the second side edge at an angle substantially normal to said upper surface of said second support member;
    an opening in between said first projecting portion and said second projecting portion, said opening configured for positioning of a solar panel therein such that a first end of the solar panel is supported by the first support member and a second end of the solar panel is supported by the second support member;
    a first astragal, said first astragal securable to said first support member to an engaged position therewith;
    a second astragal, said second astragal securable to said second support member to an engaged position therewith;
    said first astragal in said engaged position having a central portion including two generally parallel ribs extending toward the support member such that said distal end of said first projecting portion is located between the two ribs, and having a first ledge of said first astragal projecting from the center portion and including a lower surface in contact with and compressibly engaged with a first side surface of the first end of said solar panel positioned in said opening; and
    said second astragal in said engaged position having a central portion including two generally parallel ribs extending toward the support member such that said distal end of said second projecting portion is located between the two ribs, and having a first ledge of said second astragal projecting from the center portion and including a lower surface in contact with and compressibly engaged with a second side surface of the second end of said solar panel positioned in said opening;
    whereby the solar panel is maintained in a mounted position within said opening a distance above said underlying support surface by said compressible contact of said first astragal with said first side surface and said compressible contact of said second astragal with said second side surface of said solar panel.

2. The solar panel mounting apparatus of claim 1 additionally comprising:
    said metal panel formed by a first metal panel portion in an engagement to a second metal panel portion;
    said first metal panel portion having said first projecting portion extending from a first side edge thereof;
    said first metal panel portion extending from said first side edge thereof to a first folded edge opposite thereto;
    said second metal panel portion having said first projecting portion extending from a first side edge thereof;
    said second metal panel portion extending from said first side edge thereof to a first folded edge opposite thereto;
    said first folded edge of said first metal panel portion positionable to connection with said first folded edge of said second metal panel portion.

3. The solar panel mounting apparatus of claim 2 additionally comprising:
    said connection of said first folded edge of said first metal panel portion to said first folded edge of said second metal panel portion forming a secondary support member positioned to support a central area of said solar panel when positioned within said opening.

4. The solar panel mounting apparatus of claim 1 additionally comprising:
    a third support member having an upper surface and having a lower surface configured for positioning upon said underlying support surface;
    a second metal panel having a central area extending between a first side edge and an opposite second side edge;
    said second metal panel having said first side edge positioned upon said upper surface of said second support member, and having said second side edge positioned upon said upper surface of said third support member;
    a first projecting portion of said second metal panel extending to a distal end from said first side edge, said first projecting portion including a portion extending from the first side edge at an angle substantially normal to said upper surface of said second support member;
    a second projecting portion of said second metal panel extending to a distal end from said second side edge thereof, said second projecting portion including a portion extending from the second side at an angle substantially normal to said upper surface of said third support member;
    a second opening in between said first projecting portion of said second metal panel and said second projecting portion thereof, said second opening configured for positioning of a second solar panel therein such that a first end of the second solar panel is supported by the second support member and a second end of the second solar panel is supported by the third support member;
a third astragal, said third astragal securable to said third support member to an engaged position therewith;
said third astragal in said engaged position having a central portion including two generally parallel ribs extending toward the support member such that said distal end of said second projecting portion is located between the two ribs of said second metal panel;
said third astragal having a first ledge of said third astragal projecting from the center portion and including a lower surface in contact with and compressibly engaged with a first side surface of the first end of said second solar panel positioned in said second opening;
wherein the second astragal further includes a second ledge projecting from the center portion and in an opposite direction to the first ledge of the second astragal, the second ledge including a lower surface in contact with and compressibly engaged with a second side surface of the second end of the second solar panel; and
whereby said second solar panel is maintained in a mounted position within said second opening a distance above said underlying support surface by said compressible contact of said third astragal with said first side surface and said compressible contact of said second astragal with the second side surface of said second solar panel.

5. The solar panel mounting apparatus of claim 2 additionally comprising:
a third support member having an upper surface and having a lower surface configured for positioning upon said underlying support surface;
a second metal panel having a central area extending between a first side edge and an opposite second side edge;
said second metal panel having said first side edge positioned upon said upper surface of said second support member, and having said second side edge positioned upon said upper surface of said third support member;
a first projecting portion of said second metal panel extending to a distal end from said first side edge, said first projecting portion including a portion extending from the first side edge at an angle substantially normal to said upper surface of said second support member;
a second projecting portion of said second metal panel extending to a distal end from said second side edge thereof, said second projecting portion including a portion extending from the second side at an angle substantially normal to said upper surface of said third support member;
a second opening in between said first projecting portion of said second metal panel and said second projecting portion thereof, said second opening configured for positioning of a second solar panel therein such that a first end of the second solar panel is supported by the second support member and a second end of the second solar panel is supported by the third support member;
a third astragal, said third astragal securable to said third support member to an engaged position therewith;
said third astragal in said engaged position having a central portion including two generally parallel ribs extending toward the support member such that said distal end of said second projecting portion is located between the two ribs of said second metal panel;

said third astragal having a first ledge of said third astragal projecting from the center portion and including a lower surface in contact with and compressibly engaged with a first side surface of the first end of said second solar panel positioned in said second opening;
wherein the second astragal further includes a second ledge projecting from the center portion and in an opposite direction to the first ledge of the second astragal, the second ledge including a lower surface in contact with and compressibly engaged with a second side surface of the second end of the second solar panel; and
whereby said second solar panel is maintained in a mounted position within said second opening a distance above said underlying support surface by said compressible contact of said third astragal with said first side surface and said compressible contact of said second astragal with the second side surface of said second solar panel.

6. The solar panel mounting apparatus of claim 1, additionally comprising:
said first astragal is securable to said engaged position by a first screw extending through the central portion of the first astragal such that said two ribs of the first astragal are positioned on opposing sides of said first screw which is positioned within a first opening between said two ribs;
said second astragal is securable to said engaged position by a second screw extending through the central portion of the second astragal; such that said two ribs of the second astragal are positioned on opposing sides of said second screw which is positioned within a second opening between said two ribs; and
said first opening and said second opening each defining a separate passage for positioning wires therein.

7. The solar panel mounting apparatus of claim 2, additionally comprising:
said first astragal is securable to said engaged position by a first screw extending through the central portion of the first astragal such that said two ribs of the first astragal are positioned on opposing sides of said first screw which is positioned within a first opening between said two ribs;
said second astragal is securable to said engaged position by a second screw extending through the central portion of the second astragal such that said two ribs of the second astragal are positioned on opposing sides of said second screw which is positioned within a second opening between said two ribs; and
said first opening and said second opening each defining a separate passage for positioning wires therein.

8. The solar panel mounting apparatus of claim 1, additionally comprising:
a first cap, said first cap having opposing interior side edges;
said opposing interior side edges removably engageable to opposite sides of said first astragal;
a second cap, said second cap having opposing interior side edges;
said opposing interior side edges of said second cap being removably engageable to opposite sides of said second astragal.

9. The solar panel mounting apparatus of claim 2, additionally comprising:
a first cap, said first cap having opposing interior side edges;

said opposing interior side edges removably engageable to opposite sides of said first astragal;
a second cap, said second cap having opposing interior side edges;
said opposing interior side edges of said second cap being removably engageable to opposite sides of said second astragal.

10. The solar panel mounting apparatus of claim 4, additionally comprising:
a first cap, said first cap having opposing interior side edges;
said opposing interior side edges removably engageable to opposite sides of said first astragal;
a second cap, said second cap having opposing interior side edges;
said opposing interior side edges of said second cap being removably engageable to opposite sides of said second astragal;
a third cap, said third cap having opposing interior side edges;
said opposing interior side edges of said third cap being removably engageable to opposite sides of said third astragal.

11. The solar panel mounting apparatus of claim 6, additionally comprising:
a first cap, said first cap having opposing interior side edges;
said opposing interior side edges removably engageable to opposite sides of said first astragal;
a second cap, said second cap having opposing interior side edges;
said opposing interior side edges of said second cap being removably engageable to opposite sides of said second astragal.

* * * * *